UNITED STATES PATENT OFFICE.

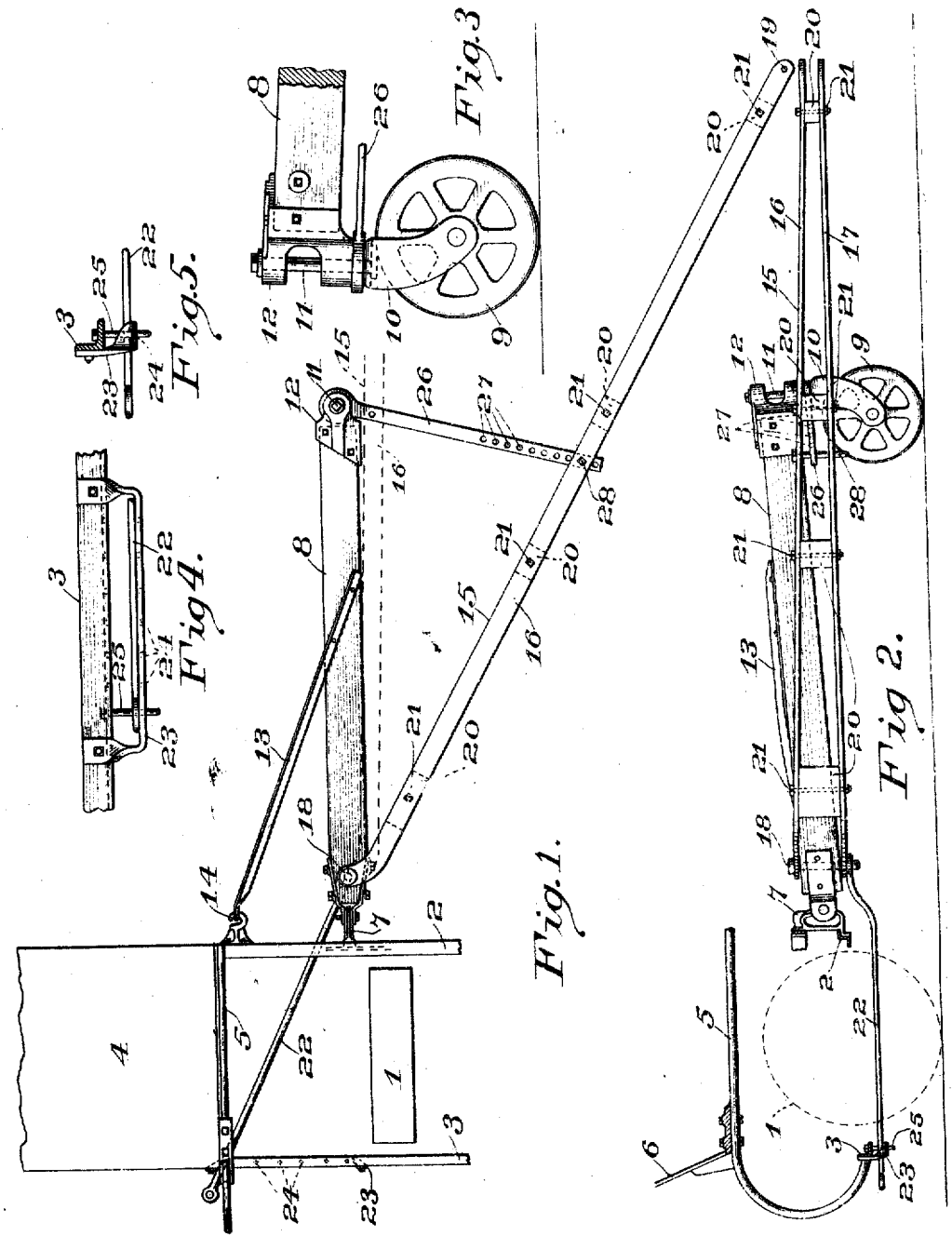

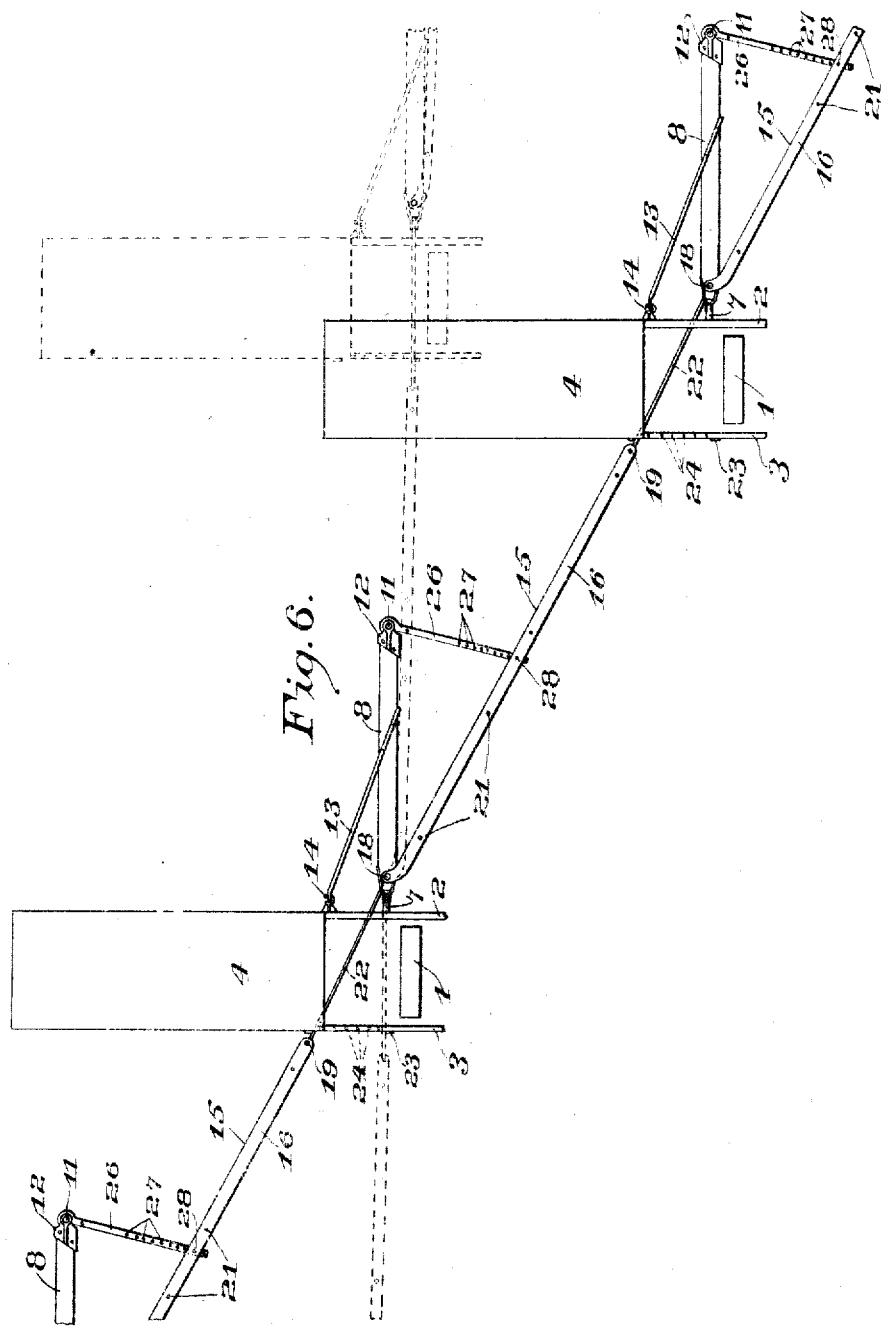

PAUL S. THERENS, OF REGINA, SASKATCHEWAN, CANADA, ASSIGNOR TO INTERNATIONAL HARVESTER COMPANY, A CORPORATION OF NEW JERSEY.

TANDEM DRAFT CONNECTION FOR HARVESTERS.

1,007,254.  Specification of Letters Patent.  Patented Oct. 31, 1911.

Application filed April 17, 1911. Serial No. 621,459.

*To all whom it may concern:*

Be it known that I, PAUL S. THERENS, a subject of the King of Great Britain, residing at Regina, in the county of Regina and Province of Saskatchewan, Dominion of Canada, have invented certain new and useful Improvements in Tandem Draft Connections for Harvesters, of which the following is a specification.

My invention relates to an improved draft device whereby a series of grain harvesters or other implements may be connected together in tandem relation and drawn forward by a single source of power, as a traction engine connected with the front machine of the series, and consists in providing draft connections between the separate harvesters and between the series and the source of power that may be manipulated in a manner to control the line of advance of one machine independent of the others in a manner whereby a greater or less width of swath may be cut by either unit of the series, the object of my invention being to provide a draft connection that may be adjusted in a manner to control the line of advance of the machines, and one wherein the draft appliances are so arranged that each unit of the tandem series is drawn by the engine in a manner that places a minimum strain upon the frames of the different units, a construction including few parts, and strong and efficient in operation. I attain these objects by means of the mechanism illustrated by the accompanying drawings, in which—

Figure 1 is a top plan view of part of a grain harvester wheel frame and grain platform having my improved draft connection applied thereto; Fig. 2 is a side elevation of Fig. 1; Fig. 3 is a detached detail showing the tongue truck in side elevation; Fig. 4 is a detail drawing showing the manner of supporting the rear end of the reach bar forming part of the draft device; Fig. 5 is an end elevation of Fig. 4; and Fig. 6 is a view designed to show the manner of connecting two or more harvesters together in tandem relation and the manner of controlling their path of advance.

The same reference characters designate like parts throughout the several views.

1 represents the traction wheel of a grain harvester, 2 the front frame member of the wheel frame and 3 the rear member thereof, and 4 represents the grain platform connected with the wheel frame in the usual manner; 5 represents the seat supporting pipe, and 6 part of a seat supporting spring having its lower end secured to the pipe.

7 represents a draft bracket secured to the front of the wheel frame of a harvester; 8 a stud tongue having its rear end flexibly connected with the draft bracket; 9 a caster wheel; 10 a stirrup having the caster wheel journaled at its lower end, and a vertically arranged stem portion 11 journaled in a bracket 12 secured to the front end of the stub tongue; 13 a tongue brace having its forward end secured to the stub tongue and its rear end pivotally connected with a bracket 14 secured to the delivery end of the grain platform.

15 represents a draft tongue including upper and lower members 16 and 17, respectively, having their rear ends pivotally connected with the rear end of the stub tongue by means of a draft pin 18, and their forward ends provided with openings 19 whereby the tongue may be connected to other draft devices.

20 represents spacing blocks placed between the two tongue members, and 21 through bolts securing the parts together.

22 represents a reach bar having its forward end pivotally connected with the lower end of the pin 18 and extending rearward and grainward under the wheel frame is supported by a yoke member 23 secured to the rear member of the wheel frame of the harvester in a manner permitting it to swing laterally relative to the line of draft of the machine, and 24 represents a series of openings in the yoke and frame member that may receive a pin 25 in a manner to limit a swinging movement of the rear end of the reach bar, said bar being provided with an opening at its rear end whereby it may be attached to another draft tongue of a harvester to be drawn in tandem relation.

26 represents a draft controlling bar having its grainward end pivotally connected with the lower end of the stem 11 of the caster wheel mechanism that supports the front end of the stub tongue, and extending stubbleward is provided with a series of openings 27 whereby its stubbleward end may be adjustably connected with the draft tongue 15 by means of a pin 28. The draft tongue may be adjusted laterally in a manner to vary the line of draft of each unit of the series of harvesters, and the reach bar may swing laterally in a manner whereby the line of draft may be varied to accommodate harvesters having different widths of cut. The reach bar being connected with the rear end of the draft tongue, there are no destructive draft strains transmitted to the platforms of the several harvesters, and I believe that I am the first to provide a continuous flexible draft connection between a source of power and a series of harvesters drawn in tandem relation.

What I claim as my invention, and desire to secure by Letters Patent, is:

1. A tandem draft connection for implements including, in combination, a stub tongue having means whereby its rear end may be pivotally connected with an implement and its forward end connected with a caster wheel mechanism, a draft tongue having its rear end pivotally connected with the rear end of said stub tongue in a manner permitting it to swing laterally relative to the line of draft of the machine, an adjustable connection between the forward end of said stub tongue and said draft tongue whereby the line of draft of the machine may be controlled, and a reach bar having its forward end pivotally connected with the rear end of said draft tongue and its rear end supported by the rear side of the implement in a manner permitting it to swing laterally relative to the line of draft of the machine.

2. A tandem draft connection for implements including, in combination, a stub tongue having means whereby its rear end may be pivotally connected with an implement and its forward end connected with a caster wheel mechanism, a draft tongue having its rear end pivotally connected with the rear end of said stub tongue in a manner permitting it to swing laterally relative to the line of draft of the machine, a draft controlling bar having its grainward end pivotally connected with the forward end of said stub tongue and its body portion provided with a series of openings whereby it may be adjustably connected with said draft tongue, and a reach bar having its forward end pivotally connected with the rear end of said draft tongue and its rear end supported by the rear side of the implement in a manner permitting it to swing laterally relative to the line of draft, and means operative to limit a swinging movement thereof.

3. A tandem draft connection for implements including, in combination, a stub tongue having means whereby its rear end may be pivotally connected with an implement and its forward end connected with a caster wheel mechanism, a draft tongue having its rear end pivotally connected with the rear end of said stub tongue in a manner permitting it to swing laterally relative to the line of draft of the machine, an adjustable connection between the forward end of said stub tongue and said draft tongue whereby the line of draft of the machine may be controlled, a reach bar having its forward end pivotally connected with the rear end of said draft tongue and its rear end supported by a depending yoke secured to the rear side of the implement in a manner whereby said bar may swing laterally relative to the line of draft, said yoke being provided with means operative to limit a swinging movement of said bar.

PAUL S. THERENS.

Witnesses:
 Douglas J. Thom,
 F. W. Hoffmeister